(No Model.) 2 Sheets—Sheet 1.
A. H. CLARK.
BICYCLE.
No. 524,131. Patented Aug. 7, 1894.
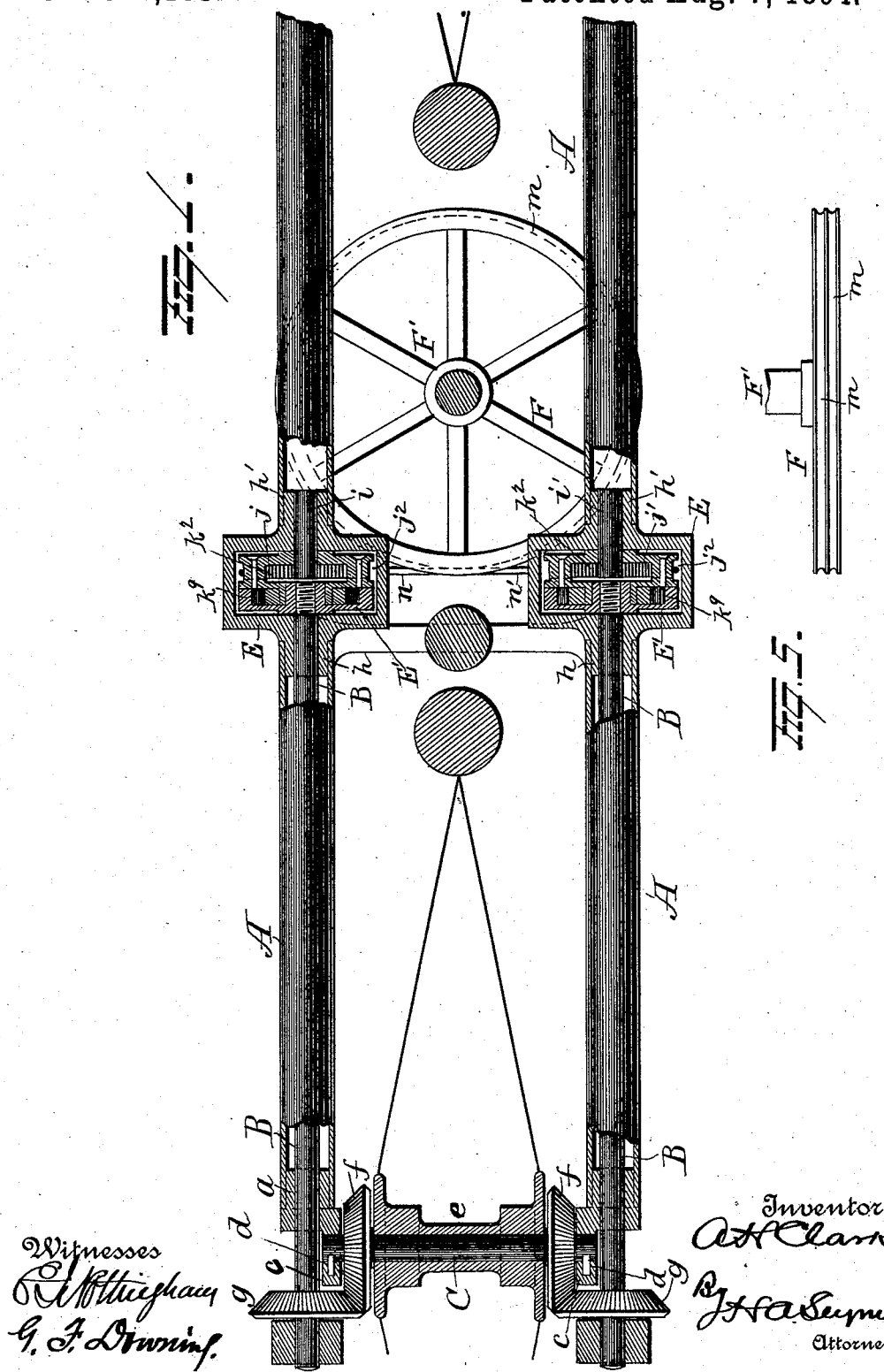

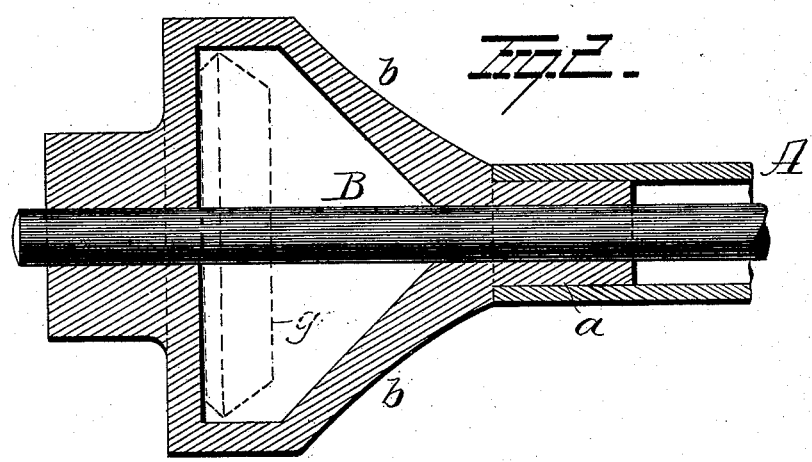
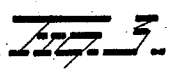
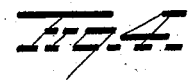
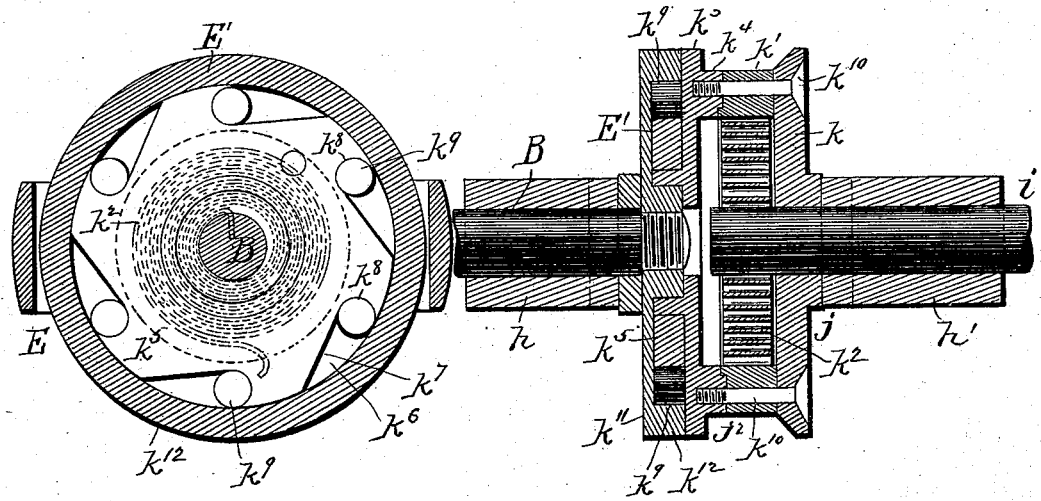

UNITED STATES PATENT OFFICE.

ALEXANDER H. CLARK, OF FOND DU LAC, WISCONSIN.

BICYCLE.

SPECIFICATION forming part of Letters Patent No. 524,131, dated August 7, 1894.

Application filed August 8, 1893. Serial No. 482,680. (No model.)

*To all whom it may concern:*

Be it known that I, ALEXANDER H. CLARK, a resident of Fond du Lac, in the county of Fond du Lac and State of Wisconsin, have invented certain new and useful Improvements in Bicycles; and I do hereby declare the following to be a full, clear, and exact description of the invention, such as will enable others skilled in the art to which it appertains to make and use the same.

My invention relates to an improvement in bicycles,—the object being to provide simple and efficient means for driving the same, and to so arrange the shafts of the driving mechanism that they shall be incased in the frame or back bones of the machine.

With this object in view the invention consists in certain novel features of construction and combinations and arrangements of parts as hereinafter set forth and pointed out in the claims.

In the accompanying drawings: Figure 1 is a view of a portion of a bicycle showing the application of my improvements thereto. Figs. 2, 3 and 4 are detail views partly in section.

A, A represent the frame bars they being of a bicycle and are made tubular, so as to accommodate shafts B, B, of the driving mechanism. In the rear end of each tube or back bone, the shank $a$ of a frame or guard $b$, is secured, the shafts B extending through said frames or guards and their shanks and have bearings at their extremities, in enlargements or bosses on the ends of said frames or guards.

From the frames or guards $b$, arms $c$ project and are disposed parallel with the shafts B. To the arms $c$, the ends of the axle C are secured by means of suitable keys $d$. The hub $e$ of the rear wheel D is mounted on the axle C and at each end carries a bevel pinion $f$. The bevel pinions $f$ are adapted to mesh with bevel pinions $g$ secured to the shafts B and located within the frames or guards $b$. Each bar A is separated at a point between its ends and a frame E inserted between the adjacent ends, said frame being provided with tubular shanks $h$, $h'$ adapted to enter the sections of the back bone, one hollow shank of each frame serving as a bearing for the forward end of the shafts B and the hollow shanks $h'$ of said frames serving to receive short shafts or axles $i$, $i'$, on which belt wheels $j$, $j'$, having grooves $j^2$ are mounted. With each bent wheel $j$, $j'$, a clutch E' is connected. In constructing these bent wheels and clutches, a disk $k$ is mounted on each short shaft $i$, $i'$, and adjacent to each disk $k$, a ring $k'$ is located.

A spring $k^2$ is arranged within the ring $k'$, one end of said spring being secured to the inner face of the ring and the other end being secured to the short shaft, $i$, $i'$. Adjacent to each ring $k'$ is a disk $k^3$ having on one face, an annular flange $k^4$ and on its other face a plate $k^5$ having recesses $k^6$, is secured.

The recesses $k^6$ are made hook-shaped,—that is to say, each recess is made with an inclined or beveled wall $k^7$, terminating at one end at the periphery of the plate and at the other end in a socket $k^8$ for the reception of a roller or ball $k^9$. Any desired number of these recesses and rollers or balls may be employed, according to the size of the device, but in the drawings I have shown six.

The disks $k$, $k^3$, and ring $k'$ carrying plate $k^5$, are secured together by means of screws $k^{10}$. The rings $k'$ and flanges $k^4$ constitute the body of the pulleys or belt wheels $j$, $j'$ and the disks $k'$, $k^3$ constitute rims for said pulleys or belt wheels. Adjacent to each disk $k^3$ and plate $k^5$ is a plate $k^{11}$ having an annular flange $k^{12}$ adapted to inclose the plate $k^5$ and with the inner face of which, the rollers or balls $k^9$ are adapted to engage when the clutch is in operative position.

The forward ends of the shafts B which project into the frames E, are screwed into the plates $k^{11}$. A large belt wheel F is mounted in the frame of the machine and provided with two grooves $m$, $m$. A vertical shaft F' is rigidly connected with the belt wheel F and is preferably provided at its upper end with a handle bar (not shown), whereby to oscillate it. Two belts or cords $n$, $n'$ are passed around the belt wheel F in the grooves $m$, $m$,—said belts or cords being secured at one end to said belt wheel and, after passing about the wheels $j$, $j'$, are secured at their other ends to said belt wheels respectively.

From this construction and arrangement of parts it will be seen that when the large belt wheel F is turned in one direction, the cord or belt $n$, will be pulled off of one of the smaller belt wheels, $j$, and the other cord or belt will be wound upon the other belt wheel, $j'$. When the cord or belt is pulled off of the belt wheel $j$, the latter will be rotated positively, and the rollers or balls $k^9$ carried by the plate $k^5$, will become wedged between the inclined wall of the recess in which it is located, and the flange $k^{12}$, thereby causing one of the shafts B to rotate and transmit motion to the rear wheel of the machine, through the medium of the bevel pinions $f$, $g$, at one side of the wheel. During this operation of one set of the driving devices, the belt wheel $j'$ of the other set, will be rotated in the reverse direction; the cord or belt $n'$ will be unwinding from the same, and the rollers of the clutch operated by the wheel $j'$, will not engage the flange $k^{12}$. When the large belt wheel F is turned in the reverse direction, the operation of the respective wheels $j$, $j'$ will be reversed. Thus it will be seen that one of the shafts B will be rotated positively at each oscillation of the large belt wheel F, regardless of the direction in which the same is turned.

My improvements are very simple and compact,—the parts are protected from injury and the devices are effective in the performance of their functions.

Various slight changes might be made in the details of construction of my invention without departing from the spirit thereof or limiting its scope, and hence I do not wish to limit myself to the precise details of construction herein set forth, but, Having fully described my invention, what I claim as new, and desire to secure by Letters Patent, is—

1. In a bicycle, the combination with frame bars, a rear wheel, a shaft mounted in the bars and means for transmitting motion from said shaft to the rear wheel, of a clutch at the other end of said shaft, a belt wheel connected with said clutch, another belt wheel, and a cord or belt secured to and passing about said belt wheels whereby motion is imparted by one to the other, substantially as and for the purpose set forth.

2. In a bicycle, the combination with the frame comprising two frame bars, and a rear wheel, of shafts mounted in said bars, a pinion carried by each shaft at the rear end, pinions carried by the rear wheel and adapted to mesh with the pinions on the shafts, a clutch at the forward end of each shaft, a belt wheel connected with each clutch, a large belt wheel, and belts or cords, each connected with and adapted to wind about the large belt wheel, said cords or belts being secured to and adapted to be wound about the belt wheel connected to the clutches, respectively, substantially as set forth.

In testimony whereof I have signed this specification in the presence of two subscribing witnesses.

ALEXANDER H. CLARK.

Witnesses:
L. E. HAZEN,
K. E. CLARK.